Nov. 28, 1950  J. E. MALY  2,531,915
COMBINED BIRD FEEDING RECEPTACLE AND PERCH
Filed March 16, 1948

INVENTOR,
James E. Maly
BY
West Oldham
ATTORNEYS

Patented Nov. 28, 1950

2,531,915

UNITED STATES PATENT OFFICE 2,531,915

COMBINED BIRD FEEDING RECEPTACLE AND PERCH

James E. Maly, Cleveland, Ohio, assignor of one-half to Frank G. Voldrich, Cleveland, Ohio Application March 16, 1948, Serial No. 15,126

4 Claims. (Cl. 119—18)

This invention is an improved combined feeding receptacle and perch for attachment to bird cages, and an important object of the invention is to provide a simple and inexpensive device of this character that may be readily applied to and removed from a cage.

Another object is to provide a combined feeding receptacle and perch that may be economically produced as an integral unit from various kinds of material, such as plastic, porcelain or glass, and that is especially convenient of cleaning, as by washing.

Another object is to provide a combined feeding receptacle and perch wherein the latter is in the nature of a platform on which a bird may stand in a natural and comfortable position while feeding, and with its body entirely over the platform-like perch.

A further object is to provide a part beneath the perch, the lower end of which is in the plane of the bottom of the receptacle so that the device may be placed upon a table or other flat supporting surface in upright position without likelihood of its upsetting.

The foregoing objects are attained in the embodiment of the invention illustrated in the accompanying drawing wherein like reference characters designate like parts in the several views.

Figure 1:
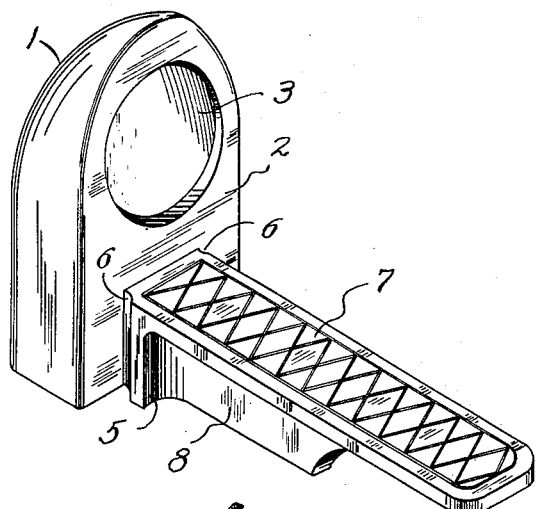
Fig. 1 is a perspective view of a combined feeding receptacle and perch constructed in accordance with my invention.

The receptacle 1 includes a front wall 2, having in the upper portion thereof a relatively large opening 3. A projection 5 extends from said wall below and in spaced relation to the opening 3, and along each side of the projection 5, adjacent the wall 2, is a groove 6. These grooves are parallel and are spaced apart approximately the same distance as adjacent vertical wires of a bird cage with which the invention is intended for use, as will hereinafter more fully appear.

Extending from the wall 2, at right angles to said wall, and at the top of the projection 5, is a perch 7. This perch is preferably flat and of a width corresponding to that of the projection 5, and it is shown as having its top surface knurled. Within the angle between the projection 5 and perch 7 is a bracket 8, said bracket being shown as extending some distance along the perch and as having its bottom surface in the same plane as the lower end of the projection 5 and the bottom of the receptacle 1. This insures the device standing upright when placed upon a table or other supporting surface.

The device is preferably molded or die-cast from plastic, porcelain, glass or other suitable material, in which case all of its elements are parts of an integral unit. Therefore, the device may be manufactured at a very low cost.

Figure 3:
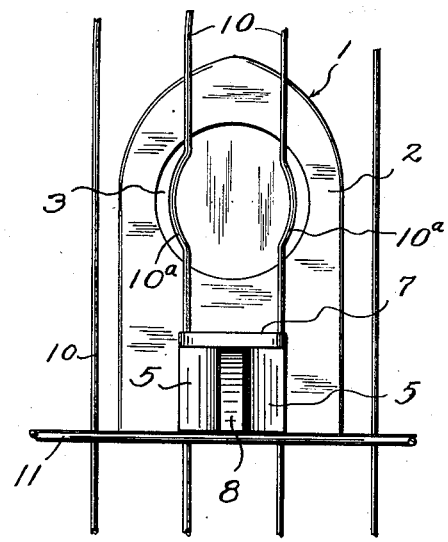
Fig. 3 is an elevational view as looking from the right of Fig. 2.
Figure 2:
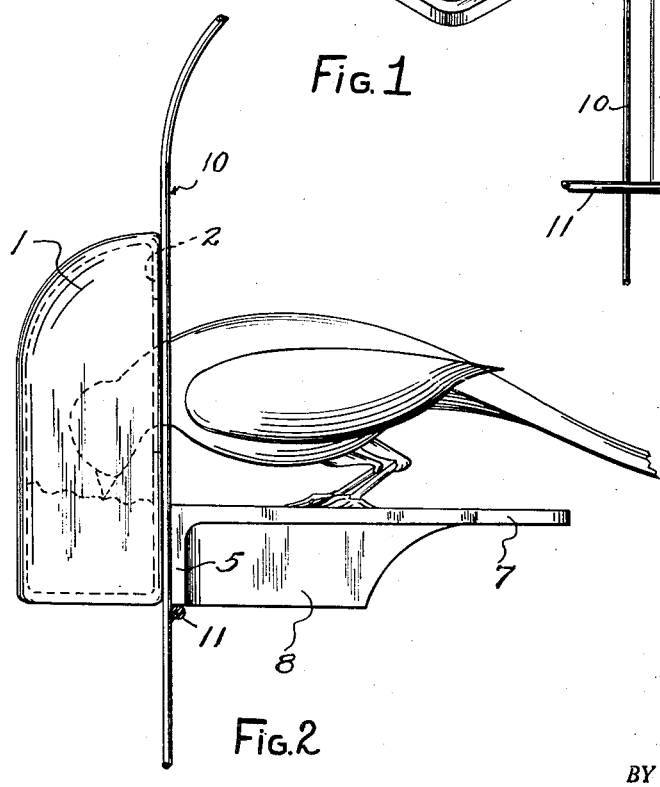
Fig. 2 is a side elevational view of the same, showing it as it would appear mounted on a cage, and illustrating the manner in which the device is used.

The invention is intended for use with bird cages of the usual construction. A fragment of such a cage is included in Figs. 2 and 3. The peripheral barrier of the cage is made up of equally spaced vertical wires 10 that are tied together by a horizontal wire 11 that is soldered, welded, or otherwise secured to the wires 10. A distance above the wire 11 (corresponding substantially to the spacing of the opening 3 above the bottom of the receptacle 1) two adjacent wires 10 are formed with opposed curved portions 10ª that provide a space through which a bird may easily project its head.

In attaching the device to a cage, the perch 7 and projection 5 are extended inwardly through the space between said curved portions 10ª until the wall 2 contacts the cage, after which the device is lowered so that the bottom of the projection 5 rests on the wire 11. With the device thus positioned, the opening 3 registers with the space between the curved portions 10ª. A bird may now stand on the perch 7, with its body substantially aligned therewith, and comfortably project its head through the aforesaid space and the opening 3 to reach seed or other food in the bottom portion of the receptacle 1.

It is evident from the foregoing that the device may be removed from the cage with equal facility for cleaning, washing and re-filling.

The conventional perches used in the bird cage should be so arranged as not to have any part thereof beneath the perch 7, thereby to avoid their becoming soiled from droppings during feeding, and to permit the droppings to fall directly to the bottom of the cage for removal at customary cleaning periods.

Having thus described my invention, what I claim is:

1. A device of the class described comprising a receptacle including a front wall having an opening in the upper portion thereof, a projection extending from said wall in vertical alignment with, and spaced from, said opening and being located between the opening and the bottom plane of the receptacle, said projection having lateral edges provided with parallel vertical grooves for the reception of adjacent wires of a bird cage, and an elongated perch having a substantially flat top surface, and being of a width substantially equal to that of said projection, extending from the top of the projection in substantially right-angular relation to the plane of said wall with one of its ends in abutting relation to the wall, all of the foregoing elements being integral parts of a rigid structure.

2. The combination of elements set forth in claim 1, plus: a bracket within the angle between the perch and projection and extending a substantial distance along the perch, the bottom surface of said bracket being in the same plane as the bottom of the receptacle.

3. A device of the class described comprising a receptacle including a front wall having an opening in the upper portion thereof, a unit formed integral with said receptacle and including an elongated perch projecting from said wall below said opening and in substantially right-angular relation to the wall with one of its ends abutting said wall, said unit having vertical grooves along the sides thereof in proximity to said wall for the reception of adjacent wires of a bird cage, and a part depending from said perch and having its lower end disposed in the plane of the bottom of the receptacle, the whole assembly constituting a rigid structure.

4. A device of the class described comprising a receptacle including a front wall having an opening in the upper portion thereof, and a unit formed integral with said receptacle and including an elongated perch projecting from the said wall below said opening and in substantially right-angular relation to the wall with one of its ends abutting said wall, said unit having vertical grooves along the sides thereof in proximity to said wall for the reception of adjacent wires of a bird cage, the width of the perch throughout its length being only slightly greater than the minimum distance between said grooves.

JAMES E. MALY.

REFERENCES CITED

The following references are of record in the file of this patent:

UNITED STATES PATENTS

| Number | Name | Date |
| --- | --- | --- |
| 1,899,508 | Klein | Feb. 28, 1933 |